United States Patent [19]

Reimer

[11] Patent Number: 5,709,841
[45] Date of Patent: Jan. 20, 1998

[54] WASTE STREAM TREATMENT

[75] Inventor: Ronald Anthony Reimer, Orange, Tex.

[73] Assignee: E.I. Du Pont de Nemours and Company, Wilmington, Del.

[21] Appl. No.: 606,140

[22] Filed: Feb. 23, 1996

[51] Int. Cl.$^6$ .................................. C01B 35/10
[52] U.S. Cl. .................. 423/283; 210/749; 210/761; 210/766
[58] Field of Search ........................ 423/283, 749; 210/766, 761

[56] References Cited

PUBLICATIONS

B.W. Hatt, "A method for investigating the effect of pH on the stability of benzeneboronic acid aqueos solution," Chem. Ind. (London) (1975), (14), 617–18.

E.W. Abel et al, "Dephenlation Reactions of Phenylboron Acids and Esters," J. Chem. Soc. (1958), 1451–3.

A.D. Ainley, F. Challenger, "Studies of Boron–Carbon Linkage Part I," J. Chem. Soc., (1930), 2171–2180.

C.J. Bannochie et al, "Factors Affecting the Rate of Hydrolysis of Phenylboronic Acid in Laboratory–Scale Precipitate Reactor Studies", ACS Symp. Ser. (1994), 554 (Emerging Technologies in Hazardous Waste Management IV), 285–98.

*Primary Examiner*—Wayne Langel

[57] ABSTRACT

A waste water cleanup process where an aqueous solution of organoboron compounds is hydrolyzed to boric acid and the corresponding organic compound by treatment at a temperature of greater than 150° C. at a pressure sufficient to prevent substantial evaporation and at a pH of 5 or greater, but 9 or less.

6 Claims, No Drawings

WASTE STREAM TREATMENT

FIELD OF THE INVENTION

This invention relates to the treatment of aqueous waste streams containing organoboron compounds in order to convert the organoboron compounds into boric acid and organic compounds. In particular this invention relates to the high temperature hydrolysis of organoboron compounds contained in an aqueous waste stream. Still, more particularly, this invention relates to the high temperature hydrolysis of phenylated boron compounds to boric acid and benzene.

BACKGROUND OF THE INVENTION

In the preparation of adiponitrile by the hydrocyanation of butadiene, organoboron compounds are often employed as promoters. See, for example, Rapoport U.S. Pat. No. 4,371,474, and Drinkard U.S. Pat. No. 3,496,218.

Organoboron compounds, such as triphenylborane, suitable for use as promoters for hydrocyanation reactions may be prepared by the process disclosed in Nazarenko U.S. Pat. Nos. 4,046,815 and 4,076,756. When such compounds are prepared in accordance with these patents, an aqueous waste stream is generated which contains varying amounts of organoboron compounds. For environmental reasons it is desirable to reduce the level of organoboron compounds in such waste streams.

C. J. Bannochie, et al., "Factors Affecting the Rate of Hydrolysis of Phenylboronic Acid in Laboratory-Scale Precipitate Reactor Studies," ACS Symp. Ser. (1994), 554 (Emerging Technologies in Hazardous Waste Management IV), 285–98, describes a process for hydrolysis of phenylborane compounds to benzene and boric acid at 90°–100° C., using Cu++ and formic acid as catalysts.

B. W. Hatt, "A method for investigating the effect of pH on the stability of benzeneboronic acid in aqueous solution," Chem. Ind. (London) (1975), (14), 617–18, discloses complete hydrolysis of monophenylboronic acid in aqueous solution at 100° C. and pH 9–12 for 90 hr. Hydrolysis was 75% complete after 90 hr at 50° C. and pH 9.

E. W. Abel, et al., "Dephenylation Reactions of Phenylboron Acids and Esters," J. Chem. Soc., (1958), 1451–3, discloses complete pyrolysis of monophenylborinic acid at 200° C. over a 25 hr period. Also showed that 20 hr at 175° C. converted diphenylborinic acid to boric acid and benzene.

A. D. Ainley, F. Challenger, "Studies of Boron-Carbon Linkage. Part I," J. Chem. Soc., (1930), 2171–2180, discloses 85% hydrolysis of monophenylboronic acid upon heating at 140°–150° C. with water for 40 hours.

The present invention provides a process to reduce the level of organoboron compounds in an effective efficient manner without the introduction of acids and metals which would make the stream difficult to biotreat subsequently.

SUMMARY OF THE INVENTION

The present invention is a process for the hydrolysis of organoboron (especially arylboron) compounds which comprises treating an aqueous solution having a pH of less than 9 but greater than 5 containing one or more organoboron compound at a temperature of 150° C. or greater at a pressure sufficiently high to prevent substantial evaporation of the aqueous solution to convert the organoboron compound to boric acid and the corresponding hydrocarbon. The term "substantial evaporation" means that greater than 25% of the liquid being treated is lost by evaporation.

The organoboron compounds that may be hydrolyzed by the process of this invention include compounds having the formula $R_3$—B, $R_4$—$B^{-1}$, $R_2$—B—OH, and R—B—$(OH)_2$ wherein the R's are the same or different and are aryl or substituted aryl groups having 6 to 12 carbon atoms, e.g., phenyl, orthotolyl, paratolyl, naphthyl, methoxy, paraphenyl, paraaminophenyl, biphenyl, chlorophenyl, and bromophenyl.

The process of the present invention is particularly useful when the organoboron compound is arylboron such as sodium tetraphenylborate, triphenylborane, diphenylborinic acid, or monophenylboronic acid, and the corresponding aromatic hydrocarbon is benzene.

The high-temperature hydrolysis reaction may be carried out in any standard chemical reactor, but preferred is reaction in a batch reactor or continuously in a plug flow reactor to minimize reactor size and equipment costs. The hold up time of the aqueous solution in the reactor will normally be greater than 1 minute.

Typically the organoboron compound content of the aqueous solution is 0.01 to 10 wt. % of the solution.

The usual operating temperature is in the range of 150° C. and 350° C. The hydrolyzability of some of the organoboron compounds is greatly increased by operating at temperatures at or above 175° C.

The hydrolyzability of some of the organoboron compounds is greatly increased when the pH range is about 7 to 8.

The preferred operating conditions are a temperature in the range of 175° to 300° C. and at a pH between about 7 and about 8.

DETAILED DESCRIPTION

Aqueous waste streams containing organoboron compounds may be the result of preparing the organoboron compounds by the method disclosed in Nazarenko U.S. Pat. No. 4,046,815, or from another source. The Nazarenko Patent is incorporated herein by reference. As noted in the '815 Patent, the organic group on the boron may be the same or different and are aryl or substituted aryl groups having 6 to 12 carbon atoms, e.g., phenyl, orthotolyl, paratolyl, napthyl, methoxy paraphenyl, paraaminophenyl, biphenyl, chlorophenyl, and bromophenyl. Such aqueous waste streams will usually contain, in addition to the organoboron compound(s), (1) alkali metal halides, (2) lower alkyl alcohols, i.e., those having 1 to 6 carbon atoms, for example, methanol, ethanol, and isopropanol, (3) boric acid, and (4) partially hydrolyzed organoboron compounds: e.g., $R_2$—B—OH and R—B—$(OH)_2$.

In order to effectively and efficiently hydrolyze the organoboron compound, it is necessary that the pH of the aqueous solution be in the range of greater than 5 and less than 9. It is usually desirable to operate at a pH of about 7 because less expensive construction materials may be used.

In order to effectively and efficiently hydrolyze the organoboron compound, it is necessary heat the solution to a temperature 150° C. or greater, and maintain a pressure such that there is no significant evaporation of the aqueous solution. Normally, temperatures in the range of 150° to 350° C. are employed, and pressures in the range of 150 to 4000 psig.

The time required to hydrolyze the organoboron compound is temperature and pH dependent: higher temperatures require less time. At a temperature of 175° C. the hold up time in the batch or plug flow reactor will normally be in the range of about 40 to 120 minutes when the pH is in the range of 7.5 to 8, and when the temperature is 200° C., the hold up time in the batch or plug flow reactor will be 10 to 45 minutes when the pH is 7.5 to 8.

Upon completion of the hydrolysis reaction, the organic compound formed, for example, benzene, may be removed from the aqueous solution by distillation. The waste stream may then be fed to a standard waste water biotreatment process for final cleanup.

The hydrolysis reaction of organoboron compounds that contain more than one organo group, for example, triphenylborane or diphenylborinic acid, proceeds in stages. Triphenylborane will be hydrolyzed to diphenylborinic acid and benzene, and then the diphenylborinic acid will be hydrolyzed to monophenylboronic acid and benzene, and finally the monophenylboronic acid will be hydrolyzed to boric acid and benzene. The waste stream will usually contain a mixture of organoboron compounds of the tetra, tri, di, and mono type.

EXAMPLE

A 350 ml piston-type high pressure pump was charged with an aqueous solution having the following approximate composition:

| | |
|---|---|
| Sodium Chloride | 7.4 wt. % |
| Isopropyl Alcohol | 0.16 wt. % |
| Monophenylboronic Acid | 442 mg/l |
| Diphenylborinic Acid | 816 mg/l |
| Triphenylborane | 624 mg/l |
| Na Tetraphenylborate | 1124 mg/l |
| Boric Acid | 585 mg/l |
| Phenol | 150 mg/l |
| Water | The balance |
| Initial pH | 7.8 |

The solution was fed at 1 ml/min, via the pump, to a ¼" O. D. by 24" long tubular reactor immersed in a sand bath for temperature control. Pressure inside the system was controlled at 700 psig to prevent boiling of the aqueous material. Liquid was retained in the tubular reactor for an average time of ca. 12.6 min. at a temperature of 200° C., after which it was cooled and collected for analysis. After treatment the solution was found to have the following composition:

| | |
|---|---|
| Sodium Chloride | 7.4 wt. % |
| Isopropyl Alcohol | 0.16 wt. % |
| Monophenylboronic Acid | ND* mg/l |

-continued

| | |
|---|---|
| Diphenylborinic Acid | ND mg/l |
| Triphenylborane | ND mg/l |
| Na Tetraphenylborate | ND mg/l |
| Boric Acid | 1125 mg/l |
| Phenol | 111 mg/l |
| Water | The balance |
| Final pH | 8.5 |

*ND means not detected.

Approximate detection limits at the time this example was run were:

| | |
|---|---|
| Na Tetraphenylborate | >50 mg/l |
| Triphenylborane | >100 mg/l |
| Diphenylborinic Acid | >100 mg/l |
| Monophenylboronic Acid | >100 mg/l |

The benzene produced is very volatile and forms a low boiling azeotrope with the water present. Because it is such a small quantity it is mainly all lost during handling of samples in the laboratory, and it was not measured.

What is claimed is:

1. A process for the hydrolysis of organoboron compounds which comprises treating an aqueous solution having a pH of less than 9 but greater than 5 containing one or more organoboron compounds of the formula $R_3$—B, $R_4$—$B^{-1}$, and $R_2$—B—OH wherein the R's are the same or different and are aryl or substituted aryl groups having 6 to 12 carbon atoms at a temperature of 150° C. or greater at a pressure sufficiently high to prevent substantial evaporation of the aqueous solution to convert the organoboron compounds to boric acid and the corresponding hydrocarbons.

2. The process of claim 1 in which the organoboron compounds are arylboron compounds selected from the group consisting of sodium tetraphenylborate, triphenylborane, and diphenylboronic acid, and the corresponding hydrocarbon is benzene.

3. The process of claim 1 in which the reaction takes place in a batch reactor or continuously in a plug flow reactor and the hold up time of the aqueous solution in the reactor is greater than 1 minute.

4. The process of claim 1 in which the arylboron content of the aqueous solution is 0.01 to 10 wt. % of the solution.

5. The process of claim 4 in which the temperature is in the range of 150° C. and 350° C.

6. The process of claim 1 in which the temperature is in the range of 175° to 300° C., and the pH is in the range of about 7 to about 8.

* * * * *